June 11, 1963  E. R. ZIEGLER  3,092,867
WINDSHIELD WIPER BLADE ASSEMBLIES
Filed May 12, 1960  2 Sheets-Sheet 1
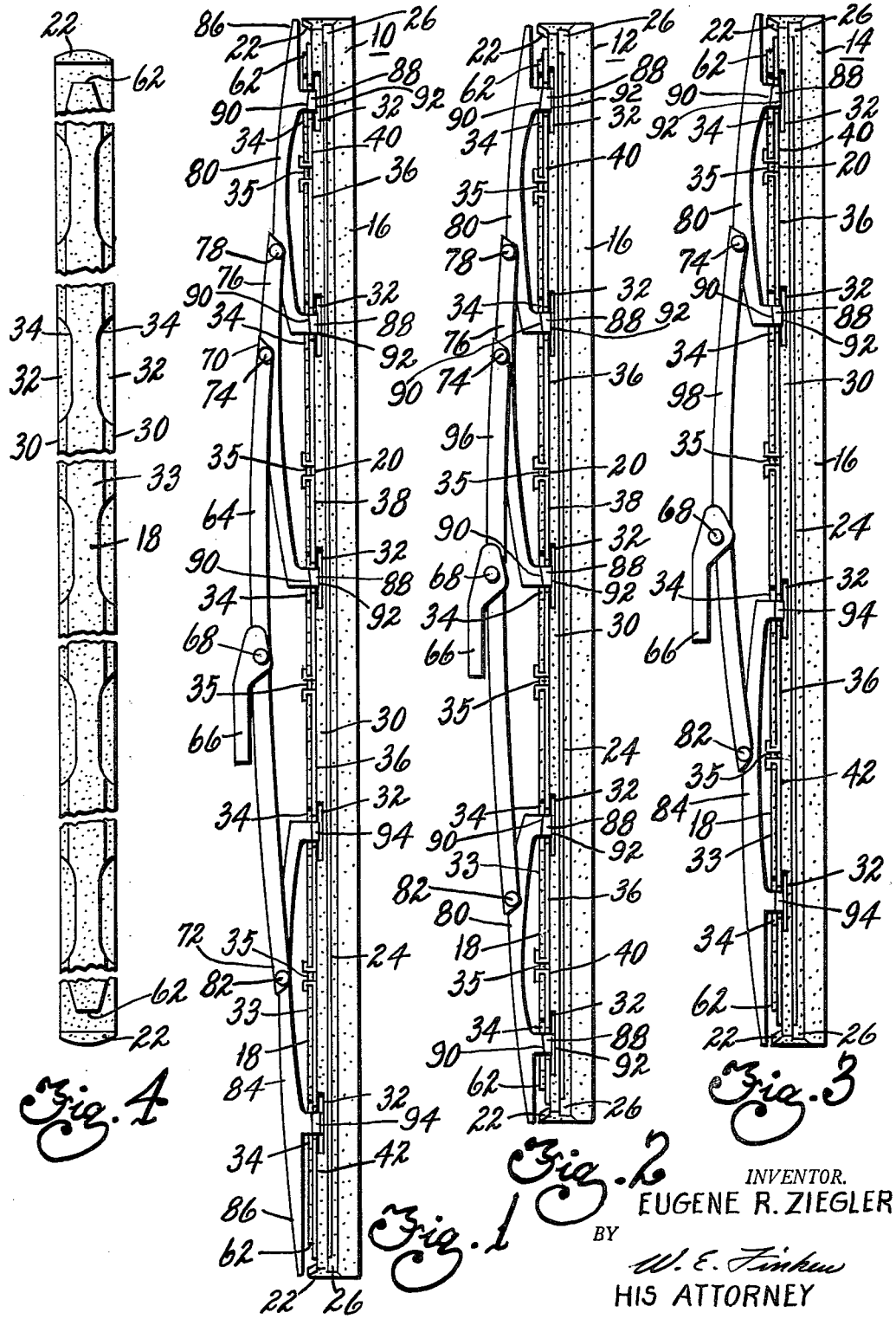
INVENTOR.
EUGENE R. ZIEGLER
BY
W. E. Finken
HIS ATTORNEY

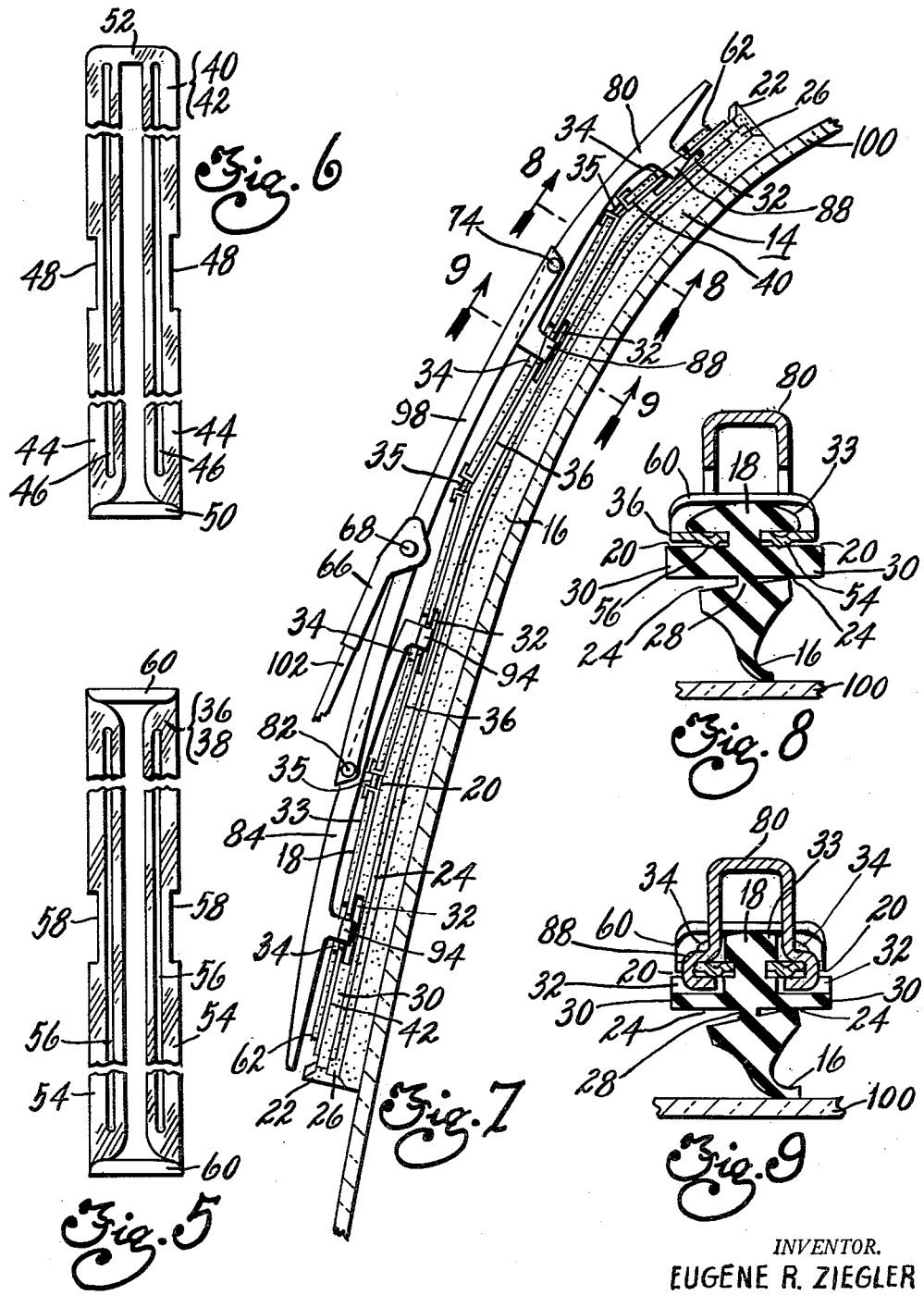

United States Patent Office 3,092,867
Patented June 11, 1963

3,092,867
WINDSHIELD WIPER BLADE ASSEMBLIES
Eugene R. Ziegler, Spencerport, N.Y., assignor to General Motors Corporation, Detroit, Mich., a corporation of Delaware
Filed May 12, 1960, Ser. No. 28,570
10 Claims. (Cl. 15—250.42)

This invention relates to windshield wiper blade assemblies, and particularly to wiper blade assemblies capable of wiping either a flat surface or a surface having a convex curvature.

In my copending application Serial No. 829,250 filed July 24, 1959, a windshield wiper blade construction is disclosed comprising an elongate elastomeric squeegee supported by a plurality of spaced apart backing strips designed to withstand any appreciable flexing in a plane normal to the surface to be wiped under wiper arm pressure, and a pressure applying superstructure comprising a pair of secondary yokes and a primary yoke. The present invention relates to improved wiper blade assemblies of the aforesaid type which are designed to conform to curvatures of smaller radius, i.e. more severely curved window surfaces including interchangeable superstructure parts and backing strips whereby wiper blade assemblies of different lengths can be readily fabricated.

Accordingly, among my objects are the provision of a wiper blade assembly designed for wiping flat and/or convexly curved surfaces including means for applying substantially equal unit length wiper arm pressure to spaced apart lengths of a squeegee unit; the further provision of interchangeable superstructure and backing strip elements which are readily adapted to facilitate the fabrication of wiper blade assemblies of different lengths; the further provision of an improved squeegee construction; and the still further provision of a superstructure and backing strip assembly designed to facilitate differential movement while maintaining equal unit length pressure distribution.

The aforementioned and other objects are accomplished in the present invention by proportioning the lengths of the backing strips in accordance with the geometry of the pressure distributing linkage so as to obtain substantially equal unit length wiper arm pressure on each backing strip. Specifically, three wiper blade assemblies of different lengths are disclosed herein. The squeegees for the wiper blade assemblies comprise elongate elastomeric elements having wiping lips along one edge and enlarged retention portions along the opposite edge. The retention portion of each squeegee is formed with longitudinal grooves which terminal short of the ends thereof for receiving the side rails of skeletonized backing strips. The backing strip grooves define a pair of flanges and an upstanding edge. The ends of the squeegee include integral stop means which preclude separation of the backing strips and the squeegee. In addition, the squeegee member is formed with a pair of longitudinally extending flexure grooves located between the retention portion and the wiping lip, the flexure grooves facilitating movement of the wiping portion relative to the retention portion to enable the wiping lip to assume the proper drag position as it is moved across the surface being wiped.

The backing strips are preferably made of spring tempered stainless steel and comprises a pair of side rails of substantially uniform cross-sectional area which are joined at the ends by cross straps. The side rails are ribbed, or corrugated, to reinforce the same so that they will withstand appreciable flexing under wiper arm pressure. The backing strips are made in three different lengths to facilitate fabrication of the blade assemblies in fifteen, sixteen and eighteen inch lengths.

The pressure distributing superstructure for the blade assemblies comprises a primary yoke, or holder, a pair of secondary yokes, at least one of which is a differential yoke, and, in the case of the sixteen and eighteen inch blades, a third class lever. The differential yokes on the three different length blade assemblies are interchangeable, as are the third class levers on the sixteen and eighteen inch blade assemblies. Likewise, the balanced secondary yokes on the fifteen and eighteen inch blade assemblies are interchangeable. Accordingly, the only element of the superstructure which must be specifically made for a particular blade length is the primary yoke.

The free ends of the secondary pressure distributing members, namely the secondary yokes and the third class lever, are each movably connected to the medial portion of a backing strip. The lengths of the backing strip are chosen so that each backing strip receives equal unit length wiper arm pressure. The differential yokes on the outer ends of all three blade assemblies, and in addition, on the inner end of the sixteen inch blade assembly, facilitates conformance of the squeegee to serve convex curvatures since these ends are capable of movement throughout a greater distance in a direction normal to the surface to be wiped.

When the wiper blade assemblies of this invention engage convexly curved surfaces the wiping edges of the squeegee assume concave shapes by flexing of the hinge portions between the space ends of the backing strips, and by uneven deformation, or lateral flexing, of the wiping lip beneath the points of attachment between the secondary pressure distributing members and the backing strips. The backing strips assume positions substantially tangent to the convexly curved surface and do not conform to the curved surface under severe drag conditions, flex slightly in a direction opposed to conformance with a convexly curved surface under wiper arm pressure.

Further objects and advantages of the present invention will be apparent from the following description, reference being had to the accompanying drawings, wherein preferred embodiments of the present invention are clearly shown and wherein similar reference numerals depict similar parts throughout the several views.

In the drawings:

FIGURE 1 is a side view, in elevation, on a reduced scale, of an eighteen inch windshield wiper blade assembly.

FIGURE 2 is a view similar to FIGURE 1 of a sixteen inch windshield wiper blade assembly on a reduced scale.

FIGURE 3 is a view similar to FIGURE 1 of a fifteen inch windshield wiper blade assembly on a reduced scale.

FIGURE 4 is a fragmentary plan view of a squeegee element.

FIGURE 5 is an enlarged fragmentary plan view of an intermediate backing strip.

FIGURE 6 is an enlarged fragmentary plan view of an end backing strip.

FIGURE 7 is a side view, in elevation, on a reduced scale, depicting the fifteen inch wiper blade engaging a convexly curved surface under wiper arm pressure.

FIGURES 8 and 9 are, respectively, enlarged sectional views taken along lines 8—8 and 9—9 of FIGURE 7.

With particular reference to FIGURES 1 through 4, the wiper blade assemblies comprise squeegee units and pressure applying superstructures. The squeegee units comprise elongate freely flexible elastomeric squeegees 10, 12 and 14 and a plurality of skeletonized backing strips, to be described hereinafter. Except for differences in length, the squeegees 10, 12 and 14 are of identical configuration, and hence only one will be described in detail with like numerals depicting similar parts on all squeegees. Thus, the squeegee 10, which may be composed of molded natural rubber, has a wiping portion with a relatively thin wiping lip 16 along one edge and an enlarged retention portion 18 along the opposite edge. The retention portion 18 is formed with a pair of longitudinally extending grooves 20 terminating short of the ends of the squeegee, and the ends of the squeegee are formed with integral upstanding stop means 22, the purpose of which will be described more particularly hereinafter. A second pair of longitudinally extending grooves 24, terminating short of the ends of the squeegee, are formed between the retention portion 18 and the wiping lip 16, the grooves 24 terminating short of the ends of the squeegee to form reinforced portions 26. The grooves 24, hereinafter referred to as flexure grooves, form a reduced neck portion 28, as seen in FIGURES 8 and 9, which permits tilting movement of the wiping portion relative to the retention portion so that the wiping portion will assume the proper drag position as the squeegee is moved across the surface to be wiped.

The backing strip grooves 20 are spaced from the flexure grooves 24 by laterally extending flanges 30 which function to preclude engagement of the metal parts of the superstructure with the glass surface being wiped under severe drag conditions. As seen particularly in FIGURES 1 and 4, arcuate cutouts 32 are molded in the flanges 30 to accommodate the connecting means of the pressure applying superstructure. Arcuate cutouts 34 are also formed in the upstanding edge 33 of the retention portion 18 in alignment with the cutouts 32 for a similar purpose. In the squeegees 10 and 12, five spaced sets of cutouts 32 and 34 are formed whereas in the squeegee 14 only four series of cutouts 32 and 34 are formed therein.

The grooves 20 of the squeegees are designed to receive skeletonized substantially rigid backing strips arranged in end to end relation with their ends spaced apart to form freely flexible squeegee hinge portions 35. In the eighteen inch blade assembly depicted in FIGURE 1, intermediate backing strips 36 are of the same length and construction, backing strip 38 is shorter than backing strips 36, and end backing strips 40 and 42 are of different lengths. Backing strips 36 are also embodied in the sixteen inch blade assembly shown in FIGURE 2 as are end backing strips 40 and intermediate backing strip 38. End backing strip 42, intermediate backing strips 36 and end backing strip 40 are embodied in the fifteen inch blade assembly of FIGURE 3.

With reference to FIGURE 6, the end backing strips 40 and 42 are of identical construction except for length, and comprise a pair of spaced coplanar side rails 44 of substantially uniform width throughout their length, each side rail having a corrugation, or reinforcing rib, 46 formed therein. The outer edge of the medial portion of each side rail is formed with a rectangular notch, or cutout, 48. The inner end of each end backing strip 40 and 42 is formed with a side rail connecting cross strap 50 which is located in a plane spaced from and above the plane of the side rails 44. The outer end of each end backing strip includes a cross strap 52 connecting the ends of the rails 44 and located in the plane thereof.

Referring to FIGURE 5, the construction of the intermediate backing strips 36 and 38 is likewise identical except for length. The intermediate backing strips include a pair of spaced coplanar side rails 54 having reinforcing ribs 56. The medial portion of each side rail 54 is notched at 58, and both ends of the side rails are interconnected by cross straps 60 which are located in a plane spaced from and above the plane of the side rails 54. By reinforcing the side rails of the backing strips, flexure of the backing strips in a plane normal to the surface to be wiped under applied arm pressure is minimized. Moreover, by virtue of the fact that each backing strip is connected at only one point between its ends to a pressure distributing member of the superstructure, the backing strips are incapable of flexing to conform with a convexly curved surface.

As clearly seen in FIGURE 4, the upper edge of the retention portion 18 terminates in spaced relation to the integral stop members 22. In this manner, the several backing strips can be assembled with the squeegee unit from either end by inserting the side rails into the grooves 20. The ends 62 of the upstanding edge 33 of the retention portion forms a stop which engages the cross strap 52 of the end backing strips and precludes movement thereof towards the center of the squeegee. The integral stops 22 coact with the end backing strips of the squeegee to preclude disassembly between the backing strips and the squeegee by outward movement of the end backing strips.

The pressure applying superstructure for the eighteen inch blade assembly of FIGURE 1 comprises a primary yoke, or holder, 64 having a clip, or arm attaching connector, 66 pivotally connected thereto by a transversely extending rivet 68. The rivet 68 is not spaced equidistantly between the ends of the yoke 64, but is located closer to the outer end 70 of the yoke 64 than the inner end 72. The outer end of the primary yoke 64 is pivotally connected by a rivet 74 in the intermediate portion of a lever 76 of the third class type. The outer end of the third class lever 76 is pivotally connected by a rivet 78 to the medial portion of a secondary yoke 80. The secondary yoke 80 comprises a differential yoke since the rivet 78 is located closer to the inner end than the outer end thereof. The inner end 72 of the primary yoke is pivotally connected by a rivet 82 to a balanced secondary yoke 84. All components of the pressure applying superstructure are composed of channel-shaped metal whereby the third class lever 76 is capable of nesting movement within the channel-shaped primary yoke 40 as is the secondary yoke 84. Similarly, the differential secondary yoke 80 is capable of nesting movement within the outer end of the third class lever 76.

The outer ends of the secondary yokes 80 and 84 are formed with integral channel extensions 86 in accordance with the teachings of copending application Serial No. 21,005 filed April 8, 1960 in the name of Elmer E. Reese and assigned to the assignee of this invention. The channel-shaped extensions 86 overly the outer end portions of the squeegee unit and are always spaced from the retention portion 18 of the squeegee. The extensions 86 serve to conceal the otherwise exposed portions of the squeegee unit at the ends thereof so as to improve the blade assembly appearance. In addition, the extensions, or shields, 86 provide protection for the outer ends of the outer backing strips and the squeegee against damage due to manual cleaning of the windshield.

The ends of the secondary yoke 80 and the free end of the third class lever 76 are formed with claws, or fingers, 88 adapted to straddle the side rails of the backing strips, the claws being located in the cutout portions thereof. The upper walls 90 of the claws 88 are inclined at an angle of approximately 5° as clearly shown in FIGURE 1 with respect to their lower substantially flat bottom walls 92, the purpose of which will be pointed out more particularly hereinafter. The ends of the secondary yoke 84 are likewise formed with claws 94 having parallel upper and lower walls and adapted to be loosely connected with the side rails of the backing strips at the cutout portions thereof.

The pressure applying superstructure for the sixteen inch blade assembly shown in FIGURE 2 comprises a primary yoke 96 which is shorter than the primary yoke 64 of the eighteen inch blade assembly. The wiper arm connector 66 is likewise pivotally connected to the primary yoke 96 by a rivet 68 at a point off center. The inner end of the primary yoke 96 is connected to a differential secondary yoke 80, and the outer end is connected to a third class lever 76. The third class lever 76 is pivotally connected to a second differential secondary yoke 80.

The pressure applying superstructure for the fifteen inch blade comprises a primary yoke 98 of shorter length than the primary yoke 96 of the sixteen inch blade assembly having a wiper arm connector 66 pivotally attached thereto by a rivet 68 and located closer to the inner end of the primary yoke than the outer end. Opposite ends of the primary yoke 98 are pivotally connected to a balanced secondary yoke 84 and a differential yoke 80 by rivets 82 and 74.

In all three wiper blade assemblies, the pressure applying superstructure is proportioned to apply substantially equal unit length wiper arm pressure to the several backing strips. Thus, assuming a nominal wiper arm pressure of eighteen ounces, in the eighteen inch blade of FIGURE 1, substantially one ounce will be applied to each inch of the squeegee throughout its length; in the sixteen inch blade substantially 1.125 ounces will be applied per inch of the squeegee, and in the fifteen inch blade 1.2 ounces will be applied per inch of the squeegee. To achieve this result, the connector 66 is arranged off center of the primary yokes in all three blade assemblies. In the eighteen inch blade assemblies of FIGURE 1 a greater pressure will be exerted on the outer end 70 of the primary yoke than the inner end 72. The same relationship exists in the sixteen inch blade of FIGURE 2. However, in the fifteen inch blade of FIGURE 3, a greater pressure will be applied to the inner end of the secondary yoke 98 than the outer end.

More specifically, the division of pressure between the ends of the primary yoke is inversely proportional to the distances from the ends of the primary yoke to the center line of the rivet 68. The same relationship exists with respect to the pivotal connection between the third class lever and the primary yokes in the blades of FIGURES 2 and 3, as well as between the differential yokes 80 and the third class levers of the blades of FIGURES 1 and 2 and the primary yokes of FIGURES 2 and 3.

In the blade assembly of FIGURE 1, the backing strips 42 and 36 are of substantially the same length whereas the backing strip 38 is shorter than the backing strips 42 and 36 and the backing strip 40 is shorter than the backing strip 38. Accordingly, a lesser amount of pressure on the claws 88 of the third class lever 76 and the outer claw of the differential yoke 80 will be required to obtain the same unit length pressure on the backing strips 38 and 40 as with the backing strips 36 and 42. The same relationship exists with respect to similar parts of the superstructures and squeegee units of the blade assemblies of FIGURES 2 and 3.

In connection with the balanced secondary yokes 84 of the blade assemblies in FIGURES 1 and 3, since the claws 94 are equidistantly spaced from the rivet 82, pivotal movement of the balanced secondary yokes about the rivet 82 will result in movement of both claws 94 throughout the same distance, but in opposite directions. However, in connection with the differential secondary yokes 80 of the blade assemblies of FIGURES 1 through 3, since the claws 88 are unequally spaced from the pivotal connections of these yokes with their respective primary yokes or third class levers, during pivotal movement of the differential secondary yokes, the claws 88 are moved through unequal distances in opposite directions, the relative distance through which the claws 88 on opposite ends of the differential secondary yokes move being directly proportional to the distances of the claws of the differential secondary yokes from the pivot, or fulcrum, point thereof. In this manner, the outer ends of the differential secondary yokes are afforded greater movement normal to the surface to be wiped so as to enable the outer end of the blade assembly of FIGURES 1 and 3 to conform to a curvature of smaller radius than the inner ends, while the blade assembly of FIGURE 2 can conform to a convexly curved surface of smaller radius at both ends thereof. For these reasons, the claws 88 of the third class lever 76 and the differential yokes 80 have their upper walls inclined relative to the lower walls, as aforedescribed, to accommodate relatively greater movement of the backing strips associated with the third class lever and the differential secondary yokes than the backing strips associated with the balanced secondary yokes 84.

With particular reference to FIGURES 7 through 9, the fifteen inch wiper blade assembly of FIGURE 3 is depicted in conjunction with a convexly curved window surface 100, with the wiper blade assembly being oscillated thereacross under pressure applied by a wiper arm 102 associated with the connector 66. As the wiper blade assembly is moved across the convexly curved surface 100, the squeegee bends, or flexes, in a plane normal to the surface 100 at the freely flexible hinge portions 35. The backing strips remain substantially flat, or planar, and assume positions substantially tangent to their respective segments of the convexly curved surface 100. Since pressure is applied from each pressure distributing member to only the medial portion of each backing strip, the wiping lip 16 will be laterally flexed in a sinuous, or serpentine, manner throughout its length. As clearly shown in FIGURE 9, the wiping lip 16 will have its greatest lateral flexure beneath the connections between the pressure applying members and its backing strips, with progressively less lateral flexure of the wiping lip toward each end of each backing strip. The least lateral flexure of the wiping lip 16 will occur beneath the hinge portions 35 since substantially no wiper arm pressure is applied thereto. The loose connection of the claws of the pressure distributing members of the pressure applying superstructures and the backing strips permit substantial tilting movement of the backing strip relative thereto, and is clearly seen in FIGURE 7. The outer end of the differential secondary yoke 80 effects substantially greater conforming action of the outer end of the squeegee enabling it to conform to a curvature of smaller radius.

From the foregoing it is readily apparent that this invention enables wiper blade assemblies of different lengths to be fabricated with interchangeable parts. The several blade assemblies include a plurality of skeletonized substantially rigid backing strips of different lengths in combination with different pressure distributing superstructure assemblies whereby blade assemblies capable of conforming to convexly curved surfaces of different radaii can be readily fabricated.

While the embodiments of the invention as herein disclosed constitute preferred forms, it is to be understood that other forms might be adopted.

What is claimed is as follows:

1. A squeegee unit for a wiper blade assembly including, an elongate freely flexible elastomeric squeegee body having a wiping lip along one edge and a retention portion along the opposite edge, said retention portion having a pair of longitudinally extending backing strip receiving grooves terminating short of the ends of the squeegee body, integral stop means at each end of the squeegee body, and a plurality of spaced backing strips having side rails disposed within the grooves of said retention portion and arranged in end to end relation to form freely flexible hinge portions between the ends of the backing strips, each backing strip having cross straps at both ends thereof integral with the side rails, the outer cross strap on each end backing strip being disposed in the plane of said side rails and engageable with said integral stop means of the squeegee body to preclude disassembly of the backing strips and the squeegee body.

2. A windshield wiper blade assembly including, an elongate freely flexible elastomeric squeegee having a wiping lip along one edge and a retention portion along the opposite edge, a plurality of backing strips secured to the retention portion of said squeegee with the ends thereof being spaced apart, at least one of said backing strips being shorter in length than another of said backing strips, and a pressure applying superstructure comprising a primary pressure distributing member and a plurality of secondary pressure distributing members operatively connected to the primary pressure distributing member, at least one of said secondary pressure distributing members comprising a differential secondary yoke having one end loosely connected to said shorter backing strip and the other end loosely connected to an adjacent backing strip whereby substantially equal unit length pressures will be applied to said backing strips and pivotal movement of said differential secondary yoke will cause differential movement of the respective backing strips.

3. A squeegee for a windshield wiper assembly including, an elongate freely flexible elastomeric body having a wiping lip along one edge and a retention portion along the opposite edge, said retention portion having a pair of longitudinally extending backing strip receiving grooves terminating short of the ends of said squeegee and defining a pair of longitudinally extending flanges and an upstanding edge terminating short of the ends of the squeegee, integral stop means at each end of the squeegee and spaced from the ends of said upstanding edge, and a plurality of spaced backing strips having side rails disposed within the grooves of said retention portion and arranged in end to end relation to form freely flexible hinge portions between the ends of said backing strips, each backing strip having cross straps at both ends thereof integral with the side rails, the outer cross strap on each end backing strip being disposed in the plane of said side rails and engageable with said integral stop means of the squeegee and one end of said upstanding edge to preclude disassembly of the backing strips and the squeegee.

4. A squeegee for a windshield wiper assembly including, an elongate freely flexible elastomeric body having a wiping lip along one edge and a retention portion along the opposite edge, said retention portion having a pair of longitudinally extending backing strip receiving grooves terminating short of the ends of said squeegee and defining a pair of longitudinally extending flanges and an upstanding edge terminating short of the ends of the squeegee, integral stop means at each end of the squeegee spaced from the ends of said upstanding edge, and a plurality of substantially flat skeletonized backing strips having side rails disposed within the grooves of said retention portion and arranged in end to end relation to form freely flexible hinge portions between the ends of the backing strips, each backing strip having cross straps at both ends thereof integral with the side rails, the outer cross strap on each end backing strip being disposed in the plane of said side rails, the inner cross strap on each end backing strip and the cross straps on both ends of the intermediate backing strips being disposed in planes substantially parallel to and spaced from the plane of said side rails to form an entrance opening for receiving the upstanding edge of said retention portion.

5. A windshield wiper blade assembly including, an elongate freely flexible elastomeric squeegee having a wiping lip along one edge and a retention portion along the opposite edge, a plurality of spaced backing strips secured to the retention portion of said squeegee, at least one of said backing strips being shorter in length than another of said backing strips, and a pressure applying superstructure comprising a plurality of relatively movable pressure distributing members having free ends, each free end of each pressure distributing member being loosely connected to one of said backing strips, said pressure applying superstructure being proportioned to apply substantially equal unit length pressure to all of said backing strips.

6. A windshield wiper blade assembly including, an elongate freely flexible elastomeric squeegee unit having a wiping lip along one edge and a retention portion along the opposite edge, a plurality of spaced backing strips secured to the retention portion of said squeegee, at least one of said backing strips being shorter in length than another of said backing strips, and a pressure applying superstructure including a differential secondary yoke for applying substantially equal unit length pressures to all of said backing strips, one end of said differential yoke being connected to said shorter backing strip and the other end of said differential secondary yoke being loosely connected to an adjacent backing strip.

7. A windshield wiper blade assembly including, an elongate freely flexible elastomeric squeegee having a wiping lip along one edge and a retention portion along the opposite edge, at least four backing strips secured to the retention portion of said squeegee with the ends thereof being spaced apart, at least one of said backing strips being shorter in length than another of said backing strips, and a pressure applying superstructure including a plurality of pressure distributing members having free ends and proportioned to apply substantially equal unit length pressures to all of said backing strips, each backing strip being loosely connected to one free end of one of said secondary pressure distributing members.

8. A windshield wiper blade assembly including, an elongate freely flexible elastomeric squeegee having a wiping lip along one edge and a retention portion along the opposite edge, four spaced backing strips secured to the retention portion of said squeegee with the ends thereof being spaced apart, one of said backing strips being shorter in length than the other backing strips, and a pressure applying superstructure comprising a primary yoke having a balanced secondary yoke pivotally connected to one end thereof and a differential secondary yoke pivotally connected to the other end thereof, each backing strip being loosely connected to a free end of one of said secondary yokes and receiving substantially equal unit length pressure therefrom.

9. A windshield wiper blade assembly including, an elongate freely flexible elastomeric squeegee having a wiping lip along one edge and a retention portion along the opposite edge, five backing strips secured to the retention portion of said squeegee with the ends thereof being spaced apart, said backing strips being of three different lengths with the shortest backing strips located adjacent the ends of the squeegee and the longest backing strips located adjacent thereto, and a pressure applying superstructure comprising a primary yoke, a first differential secondary yoke pivotally connected to one end of said primary yoke, a third class lever pivotally connected to the other end of said primary yoke, and a second differential yoke connected to one end of said third class lever, the free ends of said differential secondary yokes and said third class lever being loosely connected with individual backing strips for applying substantially equal unit length pressures to all of said backing strips.

10. A windshield wiper blade assembly including, an elongate freely flexible elastomeric squeegee having a wiping lip along one edge and a retention portion along the opposite edge, five backing strips secured to the retention portion of said squeegee with the ends thereof being spaced apart, said backing strips being of three different lengths wherein three of said backing strips are of the same length and are longer than the other two backing strips, the shortest backing strip being located adjacent one end of said squeegee with the intermediate length backing strip arranged between two of the longest backing strips, and a pressure applying superstructure comprising a primary yoke, a balanced secondary yoke pivotally connected to one end of said primary yoke, a third class lever pivotally connected to the other end of said primary yoke and a differential secondary yoke pivotally connected to one end of said third class lever, the free ends of said secondary yokes and said third class lever being loosely connected to individual backing strips for applying substantially equal unit length pressures to all of said backing strips.

References Cited in the file of this patent

UNITED STATES PATENTS

| | | |
|---|---|---|
| 2,634,446 | Mackie et al. | Apr. 14, 1953 |
| 2,739,337 | O'Shei | Mar. 27, 1956 |
| 2,807,821 | Scinta | Oct. 1, 1957 |
| 2,861,289 | Nesson | Nov. 25, 1958 |
| 2,876,482 | Oishei | Mar. 10, 1959 |
| 2,907,065 | Macpherson | Oct. 6, 1959 |
| 2,918,688 | O'Shei | Dec. 29, 1959 |

FOREIGN PATENTS

| | | |
|---|---|---|
| 67,859 | France | Oct. 14, 1957 |
| | (Addition to 1,033,521) | |
| 1,096,321 | France | Jan. 26, 1955 |